United States Patent [19]
Bahel et al.

[11] Patent Number: 5,533,352
[45] Date of Patent: Jul. 9, 1996

[54] FORCED AIR HEAT EXCHANGING SYSTEM WITH VARIABLE FAN SPEED CONTROL

[75] Inventors: Vijay O. Bahel, Sidney; Hank E. Millet, Piqua; Mickey F. Hickey, Sidney; Hung M. Pham, Dayton; Gregory P. Herroon, Piqua; Gerald L. Greschl, Dayton; Joseph B. Niemann, Troy, all of Ohio

[73] Assignee: Copeland Corporation, Sidney, Ohio

[21] Appl. No.: 300,799

[22] Filed: Sep. 2, 1994

Related U.S. Application Data

[63] Continuation-in-part of Ser. No. 259,396, Jun. 14, 1994, abandoned.

[51] Int. Cl.⁶ ................................................ F25D 17/06
[52] U.S. Cl. .................. 62/180; 62/184; 62/186
[58] Field of Search ........................... 62/126, 129, 180, 62/160, 186, 181, 183, 184

[56] References Cited

U.S. PATENT DOCUMENTS

| | | | |
|---|---|---|---|
| 3,293,876 | 12/1966 | Geisler | 62/184 |
| 3,415,071 | 12/1968 | Kompelien | 62/158 |
| 4,246,763 | 1/1981 | Mueller et al. | 62/126 X |
| 4,993,231 | 2/1991 | Torrence et al. | 62/184 X |
| 5,255,529 | 10/1993 | Powell et al. | 62/181 X |

*Primary Examiner*—Harry B. Tanner
*Attorney, Agent, or Firm*—Harness, Dickey & Pierce

[57] ABSTRACT

Liquid refrigerant temperature, measured by a sensor adjacent the flow control device, provides multiple diverse pieces of information which are used to control the indoor fan speed. liquid refrigerant temperature is used as an indication of outdoor air temperature and is also used as an indication of whether the compressor is operational or not.

30 Claims, 12 Drawing Sheets

FORCED AIR HEAT EXCHANGING SYSTEM WITH VARIABLE FAN SPEED CONTROL

CROSS REFERENCE TO RELATED APPLICATION

This application is a continuation-in-part of U.S. application Ser. No. 08/259,396, filed on Jun. 14, 1994 abandoned.

BACKGROUND AND SUMMARY OF THE INVENTION

The present invention relates generally to heat pump and air-conditioning systems (HVAC systems). More particularly, the invention relates to an improved forced air system in which the indoor fan speed is variably controlled based on measured liquid refrigerant temperature.

Heat pump and air-conditioning systems have become quite sophisticated in recent years, due in part to the desire for high efficiency and improved occupant comfort. Many of today's control systems for heat pumps and air conditioners use microprocessor-based electronics with a wide assortment of temperature, pressure and humidity sensors. On the one hand, these microprocessor-based systems, with multiple diverse sensors, are quite versatile and are far better able to optimize efficiency and occupant comfort than worthy simple systems of the past. On the other hand, microprocessor-based systems are becoming increasingly complex.

By way of example, U.S. Pat No. 5,303,561 to Bahel et al., entitled "Control System for Heat Pump Having Humidity Responsive Variable Speed Fan," issued Apr. 19, 1994, a microprocessor-based control system is described. That patent is assigned to the assignee of the present invention. It describes a system which controls indoor fan speed based on humidity measurements, to produce a slower airflow when conditions are humid, in order to help remove moisture from the air.

By way of further example, U.S. Pat. No. 5,303,562 to Bahel et al. entitled "Control System for Heat Pump/Air-Conditioning System for Improved Cyclic Performance," issued Apr. 19, 1994, another microprocessor-based control system is described. This patent is also assigned to the assignee of the present invention. It describes a system which optimizes efficiency of the ON/OFF refrigeration cycle. Indoor fan speed is controlled by a proportional electrical signal driving a variable speed motor to optimize airflow in relation to the temperature of the heat exchanging elements. Both of these systems employ a plurality of temperature sensors and a humidity sensor.

The present invention seeks to retain the advantages of microprocessor-based technology, particularly with regard to forced airflow control. Departing from the technology of the past, however, the present invention seeks to accomplish this purpose by a simplified sensing arrangement. As described more fully below, the presently preferred embodiment is capable of providing forced airflow control using a single sensor measuring condenser liquid refrigerant temperature at the inlet or upstream side of the flow control device for example, the thermal expansion valve. Compared with existing technology, the present invention uses a sensing arrangement which is simpler, easier to manufacture, install and maintain and thus lower in cost.

The present invention provides an improved forced air heat exchanging system in which a fan is positioned in the heating/cooling system to direct an airflow into heat exchange contact with a heat exchanger of the system. The fan has at least two speeds of operation and may provide either separate discrete speeds or a continuously variable speed, depending on the mode of operation of the system. A temperature sensor is coupled to the system so that it will sense the temperature of the liquid refrigerant, preferably at the inlet or upstream side of the flow control device. The metering device may be, for example, a variable expansion device or restricted orifice which delivers refrigerant to the evaporator coil.

A control circuit is coupled to the indoor fan and also to the temperature sensor for controller the speed of the fan based on the temperature of the liquid refrigerant. Preferably the control circuit includes a microprocessor which processes the condenser liquid refrigerant temperature information to select the optimal fan speed. The microprocessor selects the optimal speed by using the liquid refrigerant temperature to extract information concerning diverse system functions ordinarily sent by separate sensors. For example, from the condenser liquid refrigerant temperature, the microprocessor is able to infer the outdoor ambient temperature and to infer whether the refrigerant compressor is running or not. This information is used to select the optimal indoor fan speed.

For a more complete understanding of the invention, its objects and advantages, reference may be had to the following specification and to the accompanying drawings.

BRIEF DESCRIPTION OF THE DRAWINGS

FIGS. 9A and 9B are graphs depicting condenser liquid temperature (solid line) and indoor airflow (dotted line) both as a function of time, FIG. 9A corresponding to a heat pump in Cooling mode and FIG. 9B corresponding to a heat pump in Heating mode;

DESCRIPTION OF THE PREFERRED EMBODIMENT

Figure 1:
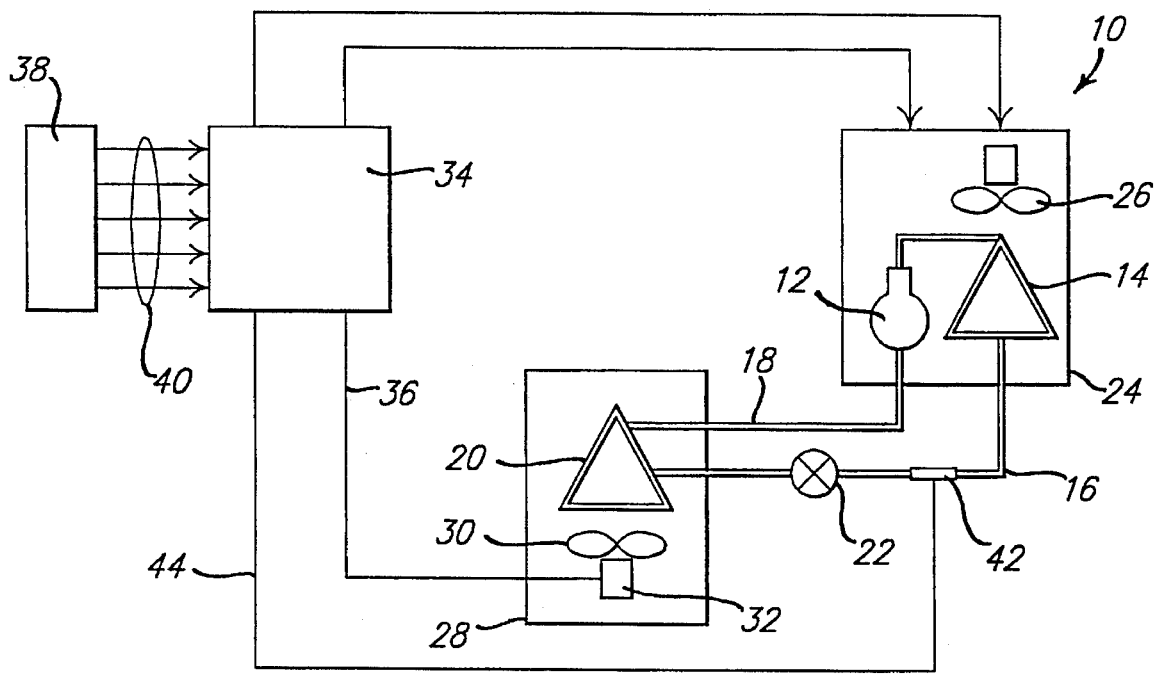
FIG. 1 is a system block diagram of the invention.

Referring to FIG. 1, the improved forced air heat exchanging system is shown generally at 10. The system works in conjunction with a heat pump or an air-conditioner system of the type having a compressor 12 and an outdoor heat exchanger 14 coupled through refrigerant liquid line 16 and refrigerant suction line 18 to an indoor heat exchanger 20. The refrigerant liquid line is controlled by flow control device 22 which may be a thermal expansion valve or other suitable metering device. Outdoor heat exchanger 14 is preferably housed in an outdoor unit 24 which includes an outdoor fan 26. Similarly, indoor heat exchanger 20 is associated with an indoor unit 28 which includes an indoor fan 30. If desired, both indoor and outdoor fans may be variable speed fans. The presently preferred embodiment uses an, electronically commutated motor 32 to drive the indoor fan which has five programmable discrete speeds.

System 10 includes a microprocessor-based controller 34 which supplies compressor and contactor 24 volt logic signals for turning compressor 12 on and off and for turning fan 26 on and off at the selected fan speed. Microprocessor-based controller 34 also provides a motor drive signal on lead 36 coupled to motor 32. Microprocessor 34 also received a plurality of signals from room thermostat unit 38. The thermostat unit supplies logic signals to the microprocessor, indicating whether the user has selected the heating mode, the cooling mode or the Fan-On mode. These logic signals are supplied on leads 40.

Temperature sensor 42 is positioned on the refrigerant liquid line 16 adjacent the inlet side or upstream side of flow control device 22 depending upon the mode of operation of heating-cooling system. In this regard, liquid refrigerant flows from the outdoor heat exchanger, through the flow control device and into the indoor heat exchanger. The refrigerant is in the liquid state in refrigerant liquid line 16 adjacent the inlet to flow control device 22, because the refrigerant has been compressed by compressor 12. Passing through flow control device 22, the liquid refrigerant is atomized into tiny liquid droplets. This occurs because the liquid is forced under pressure through the restricted orifice of the flow control device into the low pressure side of the refrigerant loop. These atomized droplets are then passed into the indoor heat exchanger where they extract heat from the atmosphere during the cooling mode. Extracting atmospheric heat causes the droplets to enter the gaseous phase. In the gaseous phase, the refrigerant is then pulled through suction line 18 back into the high pressure compressor, which again compresses the refrigerant back into the liquid phase. Temperature sensor 42 may be a thermistor placed in thermal contact with the refrigerant liquid line, preferably adjacent the inlet side of the flow control device. The thermistor provides a signal on lead 44 which the microprocessor reads to measure the liquid refrigerant temperature.

Figure 2:
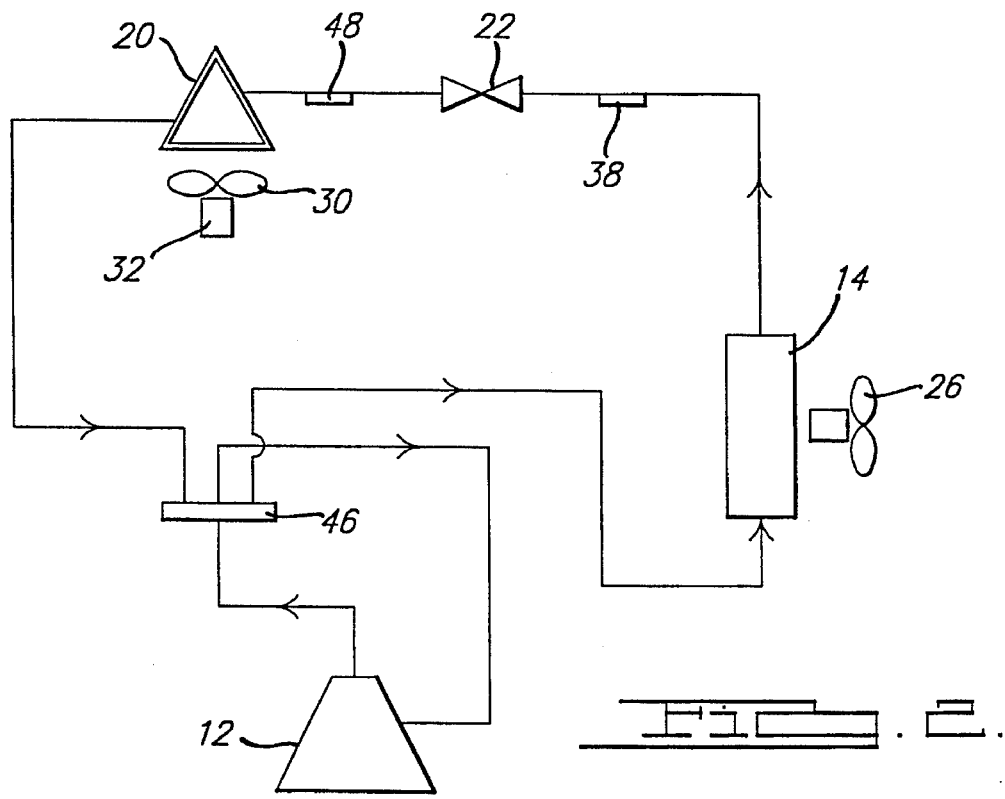
FIG. 2 illustrates how to implement the invention in a heat pump system having a single bidirectional flow control device.

The invention can be implemented in a variety of different heat pump and air-conditioning systems. To illustrate some of the possibilities, FIG. 2 depicts a heat pump system of the type using a single bidirectional flow control device. In FIG. 2 the flow control device is depicted at 22. The temperature sensor for sensing liquid refrigerant temperature is depicted at 38. The other refrigeration system components are designated using the reference numerals corresponding to like components in FIG. 1. A reversing valve 46 is used to control the flow direction. In FIG. 2 the flow arrows indicate the direction of flow when the system is in Cooling mode. The reversing valve operates so that, switched to Heating mode, refrigerant flow through the heat exchangers and flow control device is in the opposite direction. Nevertheless, in Heating mode, flow through the compressor is in the same direction as flow through the compressor in Cooling mode. If desired, a second temperature sensor 48 may be provided on the side of flow control device 22 opposite temperature sensor 38. This second sensor may also be coupled to the microprocessor circuit and is used to sense liquid refrigerant temperature when the system is operating in Heating mode (i.e. when refrigerant flow is opposite that depicted in FIG. 2).

Figure 3A:
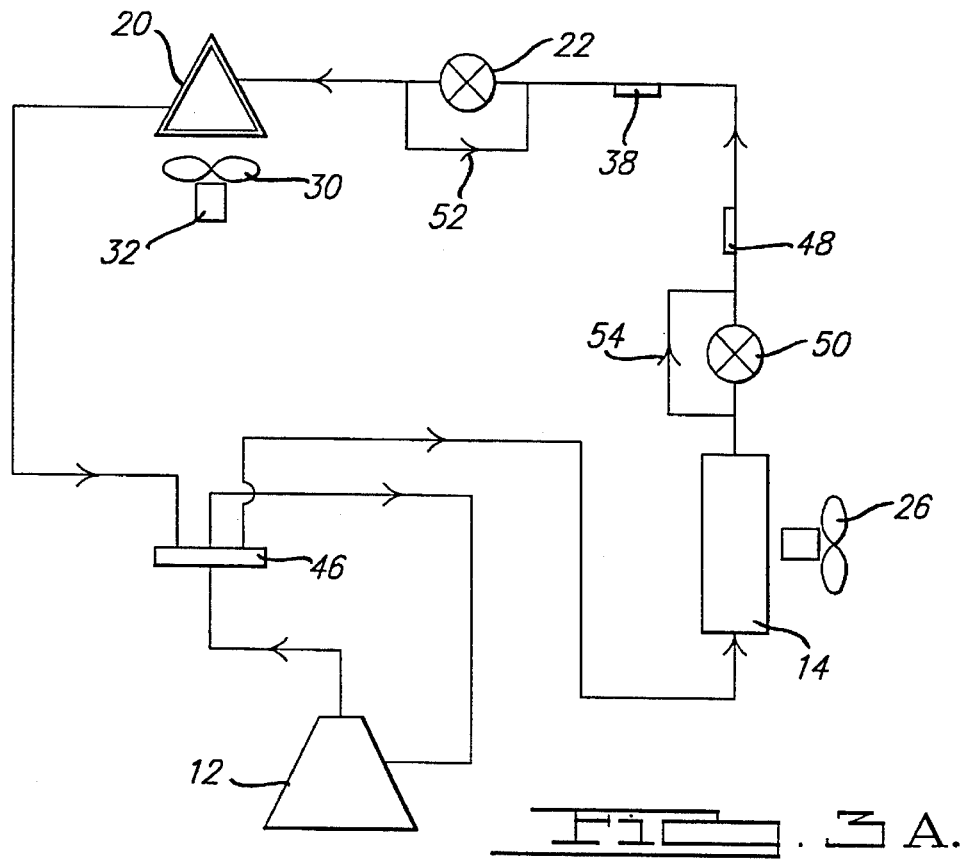
FIGS. 3A and 3B illustrate how to implement the invention in a heat pump system employing plural flow control devices, FIG. 3A depicting the heat pump in Cooling mode and 3B depicting the heat pump in heating mode.
Figure 3B:
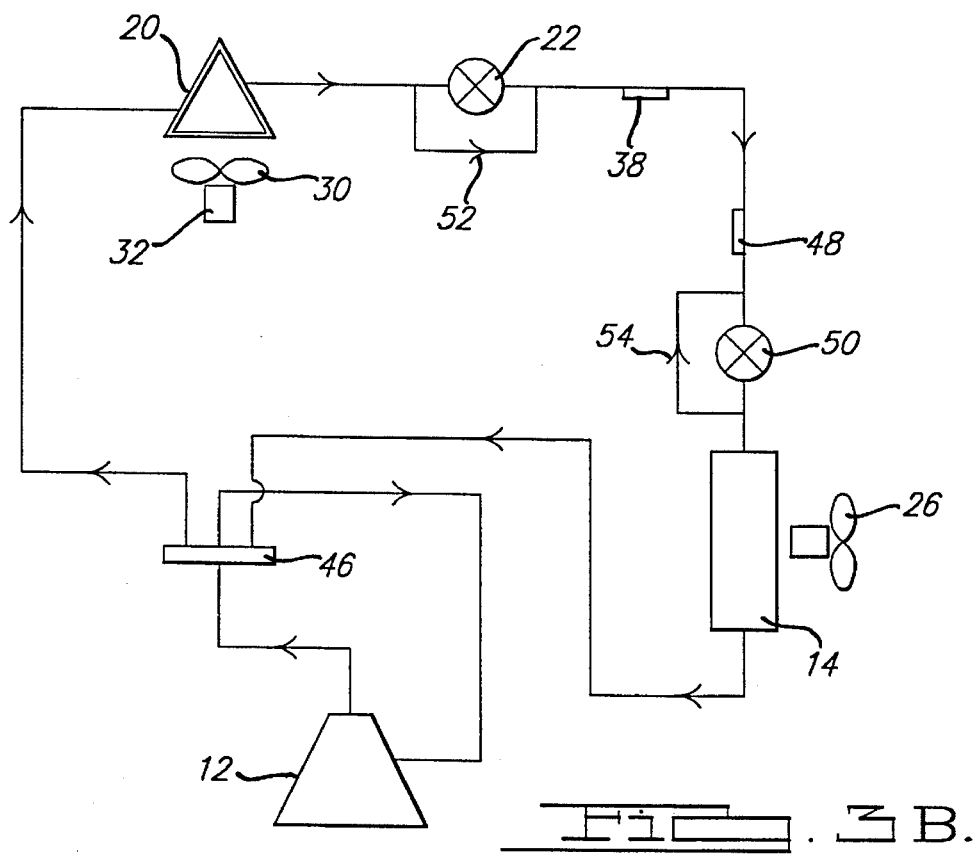

By way of further example, FIGS. 3A and 3B illustrate a dual flow control device heat pump system. FIG. 3A shows the system in Cooling mode and FIG. 3B shows the system in Heating mode. As with FIGS. 1 and 2, like components have been assigned the same reference numerals. In this case, there are two flow control devices, flow control device 22 and flow control device 50. The flow control devices are each protected by check valves 52 and 54, respectively. The check valves effectively bypass the associated flow control device when refrigerant flow is in one of the two directions of the heat pump. Thus in FIG. 3A flow control device 50 is bypassed and in FIG. 3B flow control device 22 is bypassed. Note that in both Figures a single temperature sensor 38 has been provided to sense liquid refrigerant temperature. If desired, a second temperature sensor 48 may also be provided at the location shown so that the two sensors are always located at the inlet of the metering device. Depending on the system configuration, this second temperature sensor 48 may not be required, so long as temperature sensor 38 is positioned at a point where it will sense liquid refrigerant temperature in either Cooling mode or Heating mode.

Figure 4A:
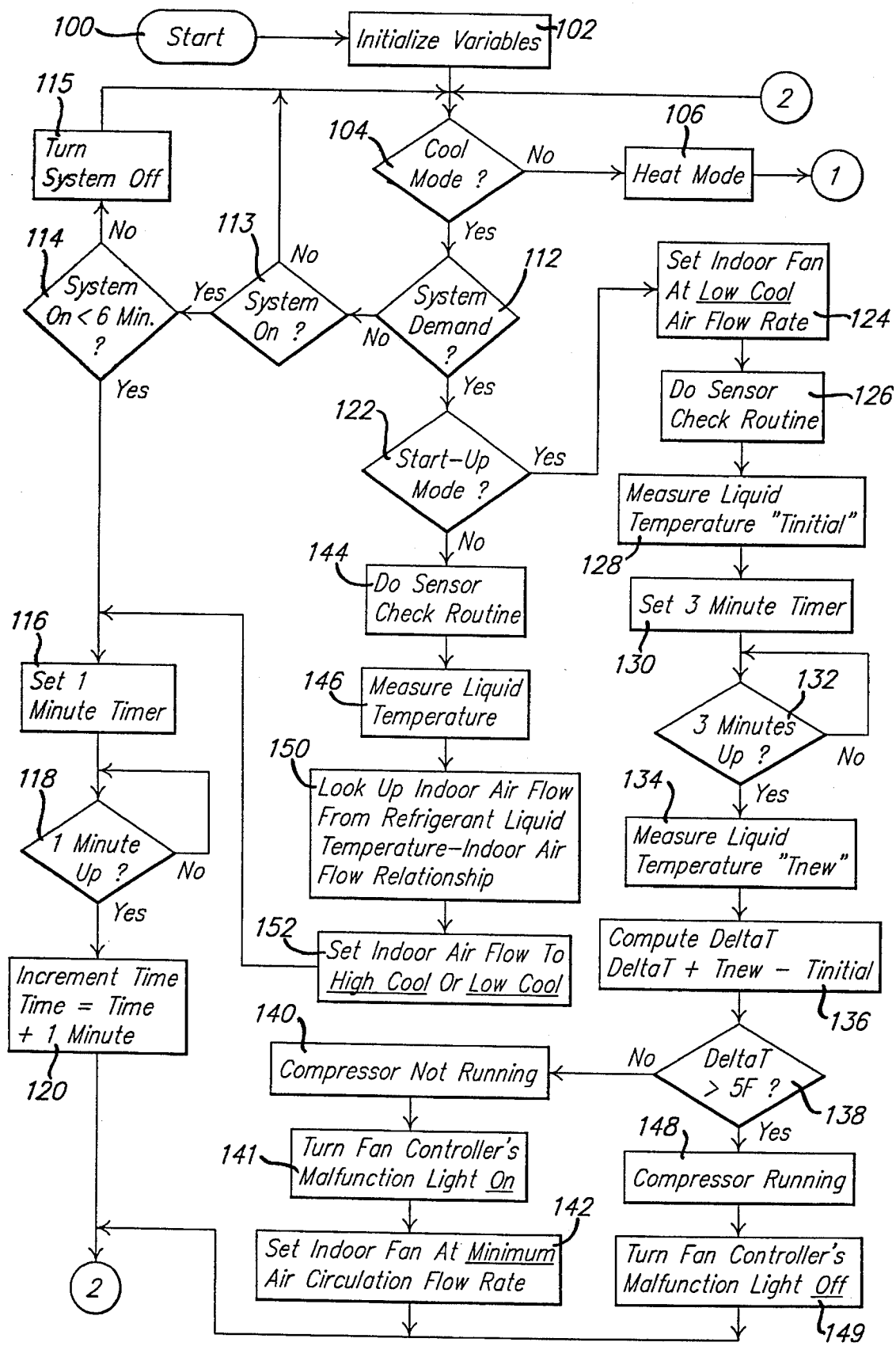
FIGS. 4A through 4C are flowchart diagrams illustrating the presently preferred microprocessor programming.
Figure 4B:
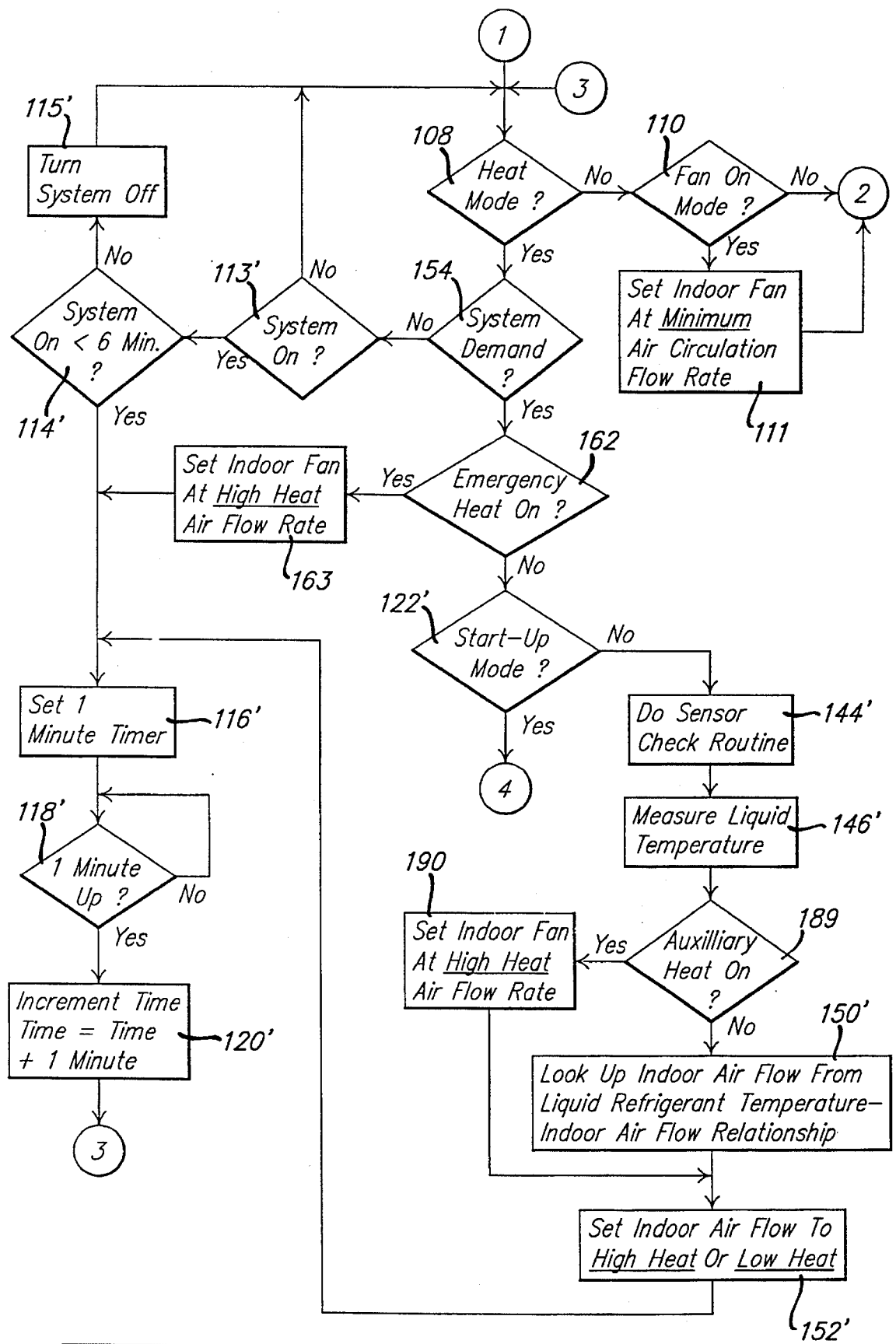
Figure 4C:
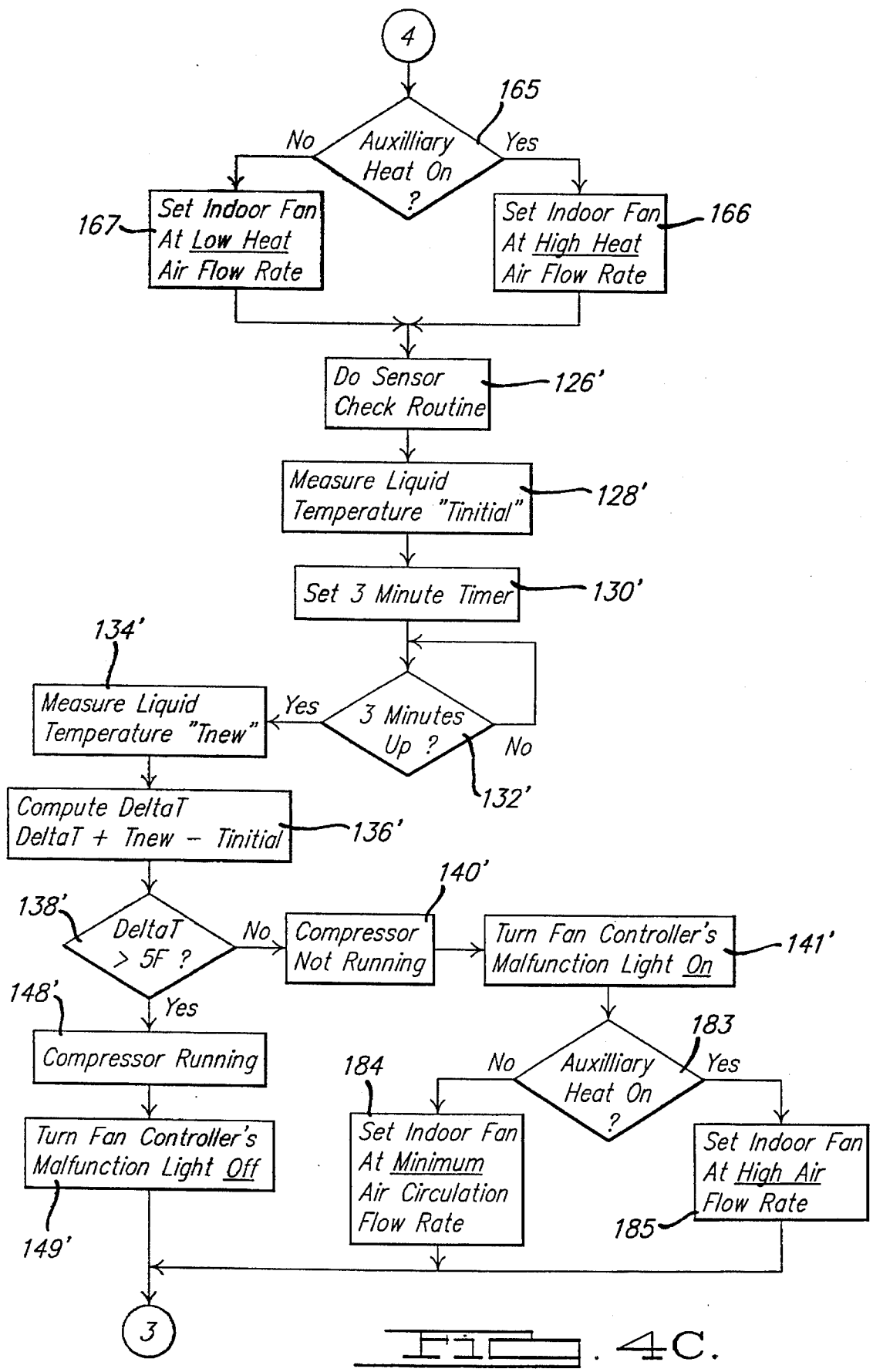

Referring next to FIGS. 4A through 4C, the presently preferred microprocessor control routines are illustrated commencing at step 100. The routine first initializes variables at step 102 and then enters a series of tests to determine what mode the system is in. In step 104, a test is performed to determine whether the system is in the cooling mode or not. If not, control proceeds through step 106 to step 108 (FIG. 4B) where a similar test is performed to determine if the system is in Heating mode. If not in Heating mode, then the system proceeds to step 110 where a determination is made whether the system is in Fan-On mode. These modes are user-selectable via the room thermostat. Thus, the microprocessor software simply reads the state of the user-settable thermostat switches. If the Fan-On mode has been set, then the routine sets the indoor fan to the minimum circulation flow rate at step 111 and then returns to location 2 on FIG. 4A. If, at step 110, the Fan-On mode has not been selected, then control simply returns to location 2 on FIG. 4A, without changing the fan speed. The process continues to loop or cycle from cooling mode test 104, to heating mode test 108, to Fan-On test 110 until a selection has been made.

Assuming the Cooling mode has been selected, control proceeds to step 112 where a determination is made whether the system demand is met. This determination is made based on a signal from the thermostat. If the thermostat is calling for cooling, then control will branch to step 122. On the other hand, if the thermostat is not calling for cooling, then control will branch to step 113 where control branches depending on whether the system is on or not. If the system is on, control branches to step 114 where a determination is made whether the system has been on for less than six minutes. If the system has not been on for six minutes, the system is turned off at step 115 and, control simply branches back where it enters the mode test loop.

If the system has been on for less than six minutes, step 114, control branches to step 116 where a one minute timer is set and tested at step 118. After the one minute time has elapsed, the system on-time variable "Time" is incremented by one minute at step 120 and control branches back to point 2.

Figure 5:
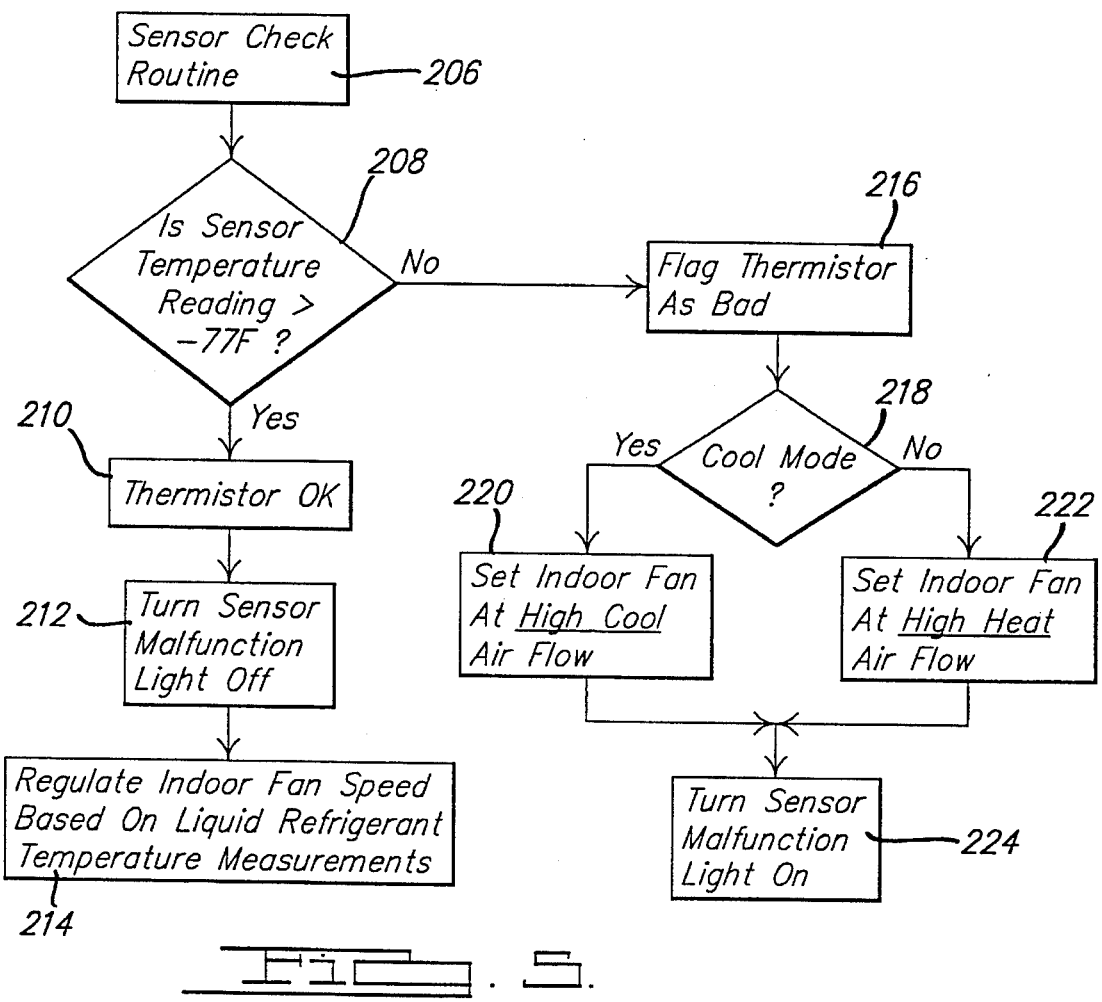
FIG. 5 is a flowchart illustrating the sensor check routine used in the program of FIGS. 4A–C.

If the thermostat is calling for cooling at step 112, control proceeds to step 122, where a determination is made whether the system is in start-up mode or not. This may be done by setting and reading a flag. If the system is in start-up mode, the indoor fan is set at the low cool airflow rate at step 124, selected by lookup table which stores a value used for low flow rate in the Cooling mode. Next, control proceeds to step 126 where a sensor check routine is performed as depicted in FIG. 5 and discussed later. After the sensor integrity has been verified, control proceeds to step 128 to measure the condenser liquid temperature. Thereafter, a three minute timer is set at step 130 and the program then cycles at step 132 until the three minute timer has elapsed. Then, the liquid temperature is measured again and stored as value Tnew, at step 134. A delta T is then calculated by subtracting Tnew—Tinitial, where the initial value is a predetermined stored value representing a low temperature condition. This occurs at step 136. If the calculated delta T is greater than 5° F. as determined at step 138, a determination is made that the compressor is not running (step 140). In this instance, a malfunction light is turned on in step 141, indicating a compressor start malfunction has occurred, and the indoor airflow is set at the minimum circulation rate at step 142. Otherwise, if the delta T is greater than 5° F., a determination is made that the compressor is running (step 148), whereupon the malfunction light is turned off at step 149.

If the system is not in start-up mode at step 122, then a simpler procedure is followed. At step 144, the sensor check routine is performed and at step 146 the condenser liquid temperature is measured. Then, since the compressor may be assumed to be running, the system simply proceeds to step 150 where the look-up table is used to set the appropriate fan speed. Thereafter, in step 152, the indoor airflow is set to the high cool or low cool setting based on the airflow relationship determined in step 150.

The operation is essentially the same for the heating mode as it is with the cooling mode, proceeding beginning at step 154 as illustrated. One difference in heating mode is that the system must also control the auxiliary heat, which may be electric resistance heaters, for example. See steps 165, 183 and 189 for example. After step 165, if the auxiliary heat is on, the indoor fan is set at the high heat air flow rate at step 166 and if the auxiliary heat is off, the indoor fan is set at the low heat air flow rate at step 167. After step 183, if the auxiliary heat is on, the indoor fan is set at the high air flow rate at step 185 and if the auxiliary heat is off, the indoor fan is set at the minimum air circulation flow rate at step 184. After step 189, if the auxiliary heat is on, the indoor fan is set at the high heat air flow rate at step 190 and step 150' is skipped. If, at step 189, the auxiliary heat is off control moves to step 150'. Also, the system provides an Emergency Heat mode, tested for at step 162, to insure that the fan is operating at high heat airflow rate (step 163) in emergency conditions, to prevent pipes from freezing, for example. The remaining steps illustrated in FIG. 4B and 4C are essentially the same as those for the cooling mode and are identified using the same reference numerals with the reference numerals being primed. A with the reference numerals being primed. A description of these steps will therefore not be repeated.

Turning now to FIG. 5, the sensor check routine begins at step 206. If the sensor temperature reading is greater than −77° F. ( step 208 ), then the thermistor is deemed to be operational at step 210 and the sensor malfunction light is switched off at step 112. In this case the indoor fan speed may be regulated based on refrigerant temperature measurements as indicated at step 214.

On the other hand, if the sensor temperature reading is not greater than −77° F., then the thermistor is assumed to be bad at step 216. In this case, the indoor fan speed is set to the High/Cool airflow speed or the High/Heat airflow speed, depending on whether the system is in Cooling mode or not. This is illustrated in steps 218, 220 and 222. Also, in the event of a bad thermistor condition, the sensor malfunction light is turned on at step 224.

Reference will next be made to FIGS. 6, 7, 8A–8B and 9A–9B. These Figures give information on how the presently preferred look-up table values are arrived at. Of course, different values may be chosen from those illustrated here, depending on the operation of the system and design preferences. The values illustrated here represent the presently preferred embodiment.

Figure 6:
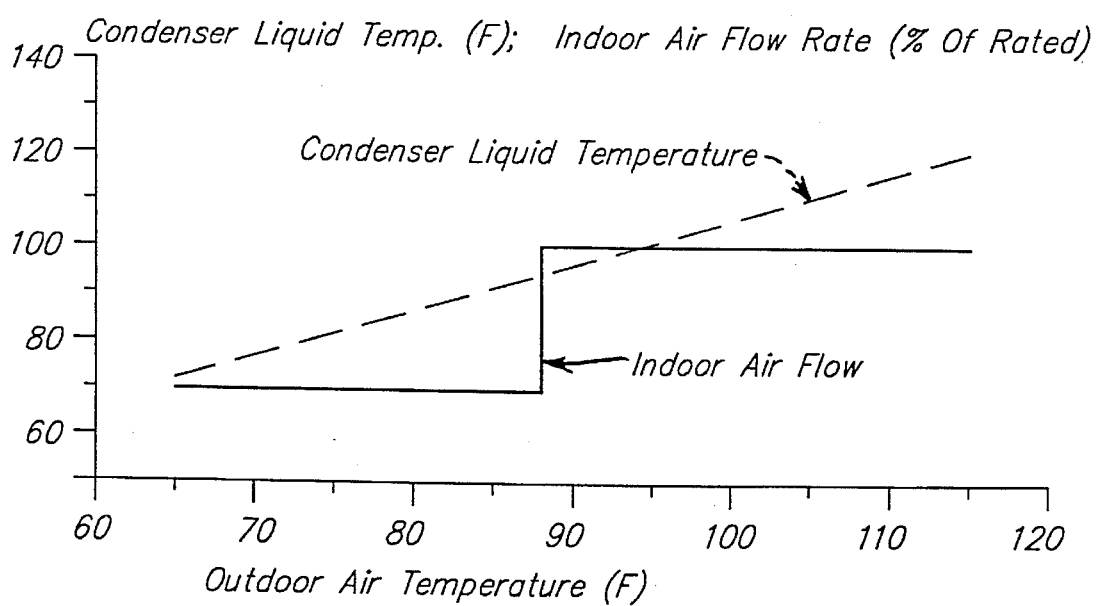
FIG. 6 is a graph illustrating the relationship between indoor airflow rate (solid line) and condenser liquid temperature (dotted line), both as a function of outdoor air temperature.

In FIG. 6 the relationship between condenser liquid temperature and indoor airflow is shown. Note that the condenser liquid temperature is a linearly increasing function which may be treated as a function of outdoor air temperature. Indoor airflow is switched from the low speed to the high speed at a liquid temperature corresponding to an outdoor air temperature of approximately 88°. The illustrated airflow speed is 70% of maximum for outdoor air temperatures below 88°, and 100% (maximum) at outdoor air temperatures above 88°. The switch-over point occurs, as illustrated, at a liquid refrigerant temperature of 94°. The values illustrated in FIG. 6 correspond to a system operating in Cooling mode. If desired, different speeds may be programmed in Heating mode. Also, if desired, a different liquid temperature may be programmed to signify the switchover point.

Figure 7:
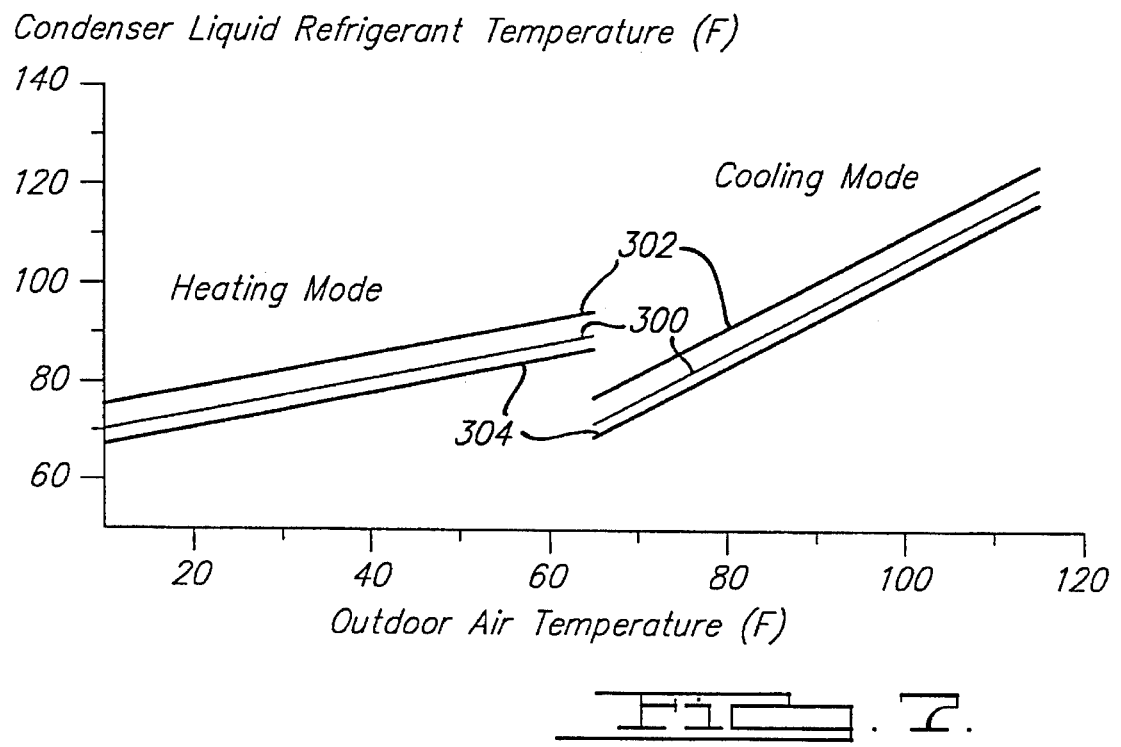
FIG. 7 is a graph depicting condenser liquid refrigerant temperature as a function of outdoor air temperature for both Heating and Cooling modes, illustrating the effect of refrigerant undercharging and overcharging.

FIG. 7 illustrates two families of curves, one family for the Heating mode and one family for the Cooling mode. In each family reference numeral 300 designates a normally charged system, reference numeral 302 designates a significantly undercharged (−30%) system and reference numeral 304 designates an (+30%) overcharged system. This Figure illustrates the effect of refrigerant charge on condenser liquid temperature. In some systems where a certain variance in the fan speed switchover point can be tolerated, it is not necessary to modify the measured liquid refrigerant temperature to compensate for undercharged and overcharged conditions. However, for more precise control of the indoor airflow, the system can be programmed to compensate for undercharged and overcharged conditions by adding or subtracting a suitable compensation value to or from the measured liquid refrigerant temperature.

Figure 8A:
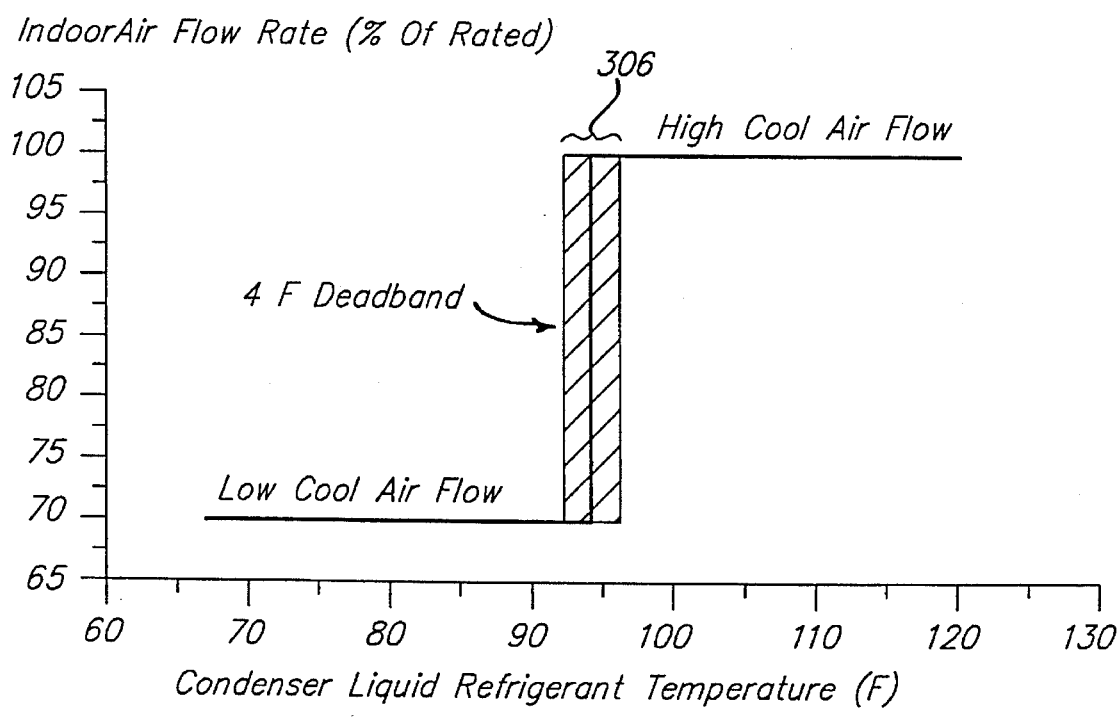
FIGS. 8A and 8B are graphs depicting indoor airflow rate as a function of condenser liquid refrigerant temperature, FIG. 8A corresponding to a heat pump in Cooling mode and FIG. 8B corresponding to a heat pump in Heating mode.
Figure 8B:
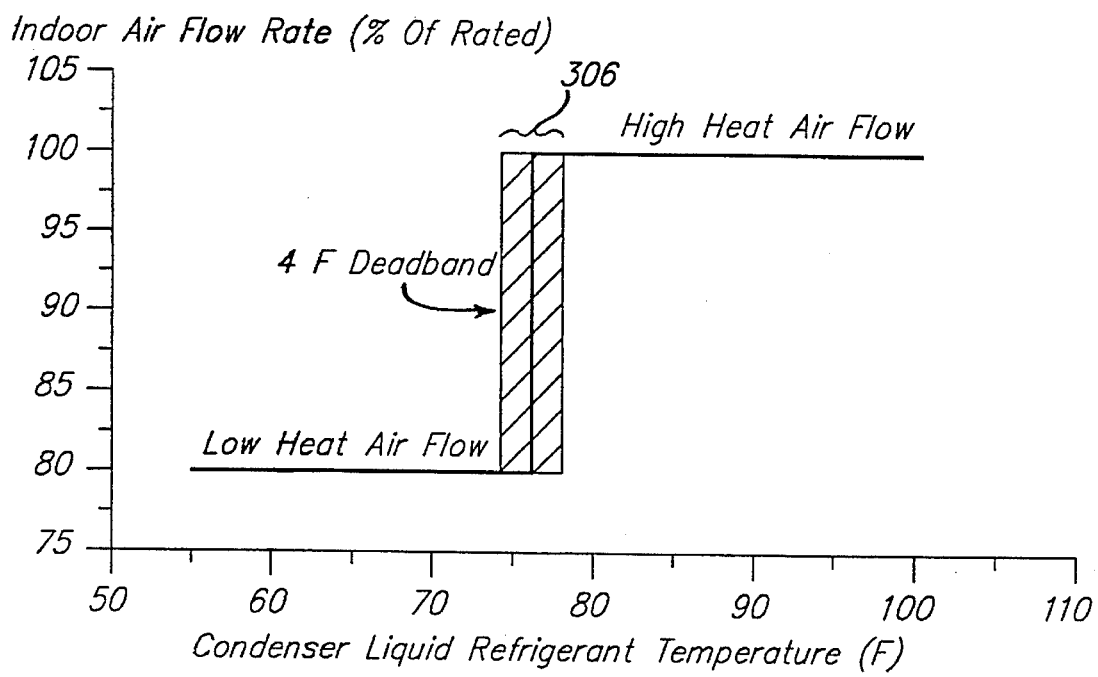
Figure 8A:
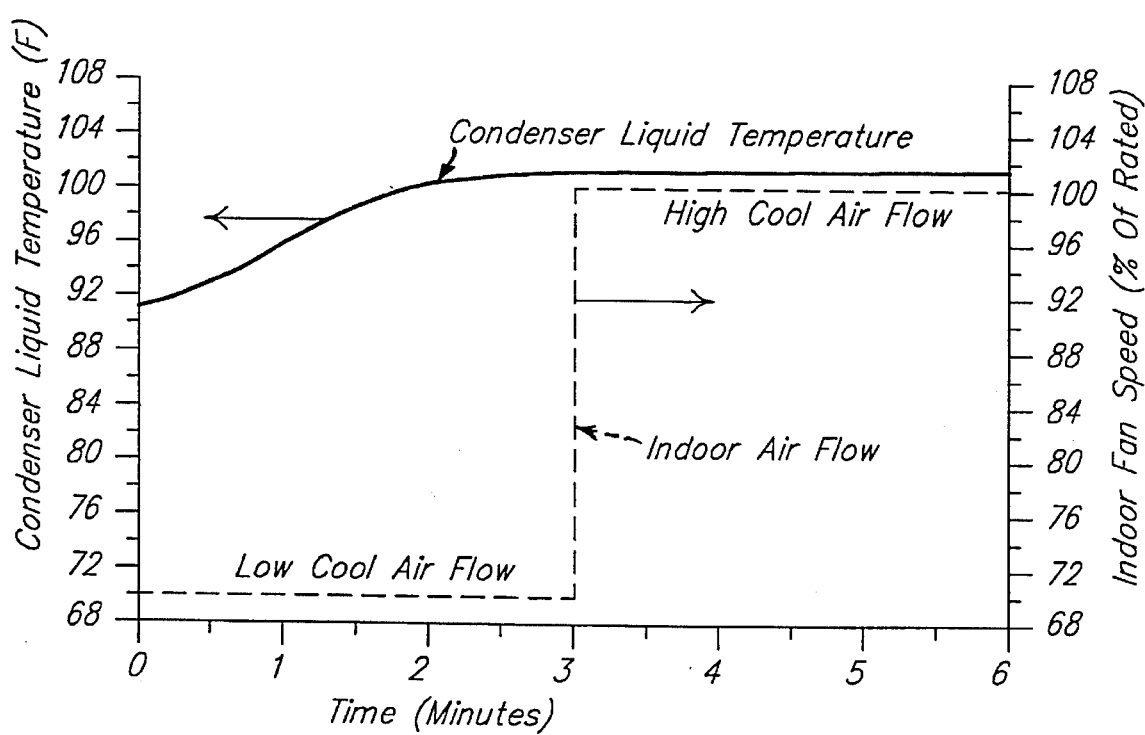

FIGS. 8A and 8B show the indoor airflow rate as a function of liquid refrigerant temperature for Cooling mode and Heating mode, respectively. As illustrated, in both cases a 4° F. dead band 306 is provided. In other words, taking the Cooling mode (FIG. 8A) as an example, airflow is switched from the low speed to the high speed when the liquid temperature is 96° F. Fan speed is switched from high speed to low speed when the liquid refrigerant temperature falls to 92° F. Comparing FIGS. 8A and 8B, note that the switchover point for the Cooling mode is preferably at 94° F. whereas in the Heating mode the switchover point is preferably 77° F. Of course, these switchover points represent the presently preferred embodiment. Other embodiments are possible.

Figure 9B:
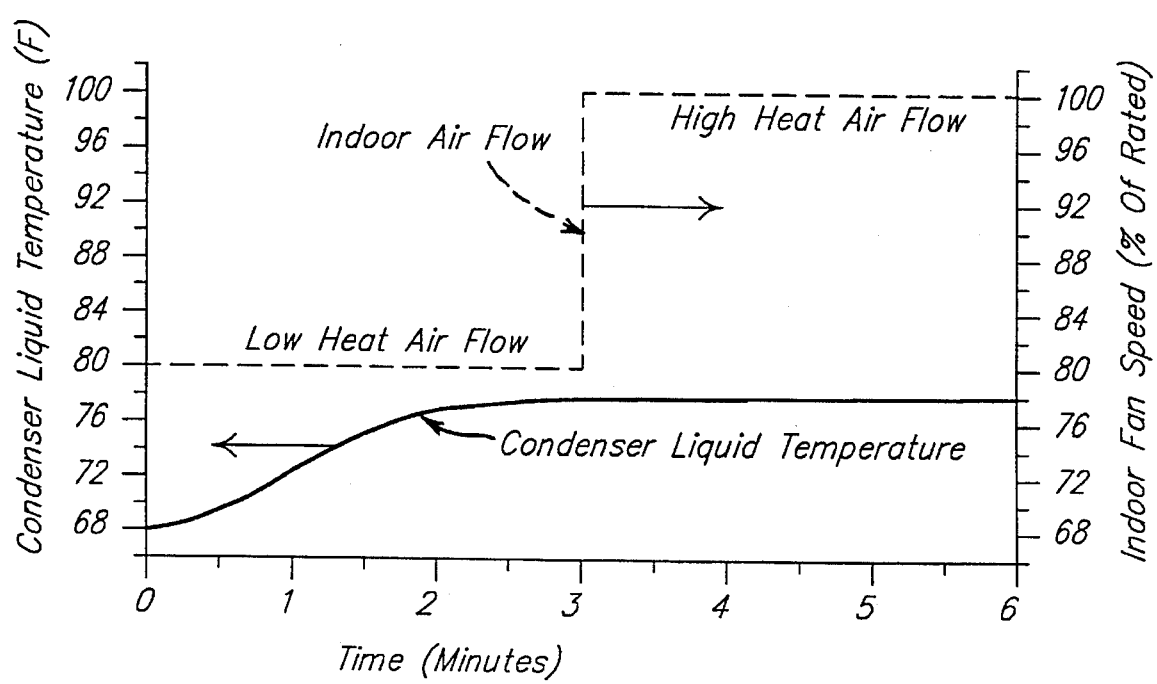

FIGS. 9A and 9B show the condenser liquid temperature response during the heating-cooling modes along with the indoor fan strategy on system startup. It may be seen that the indoor fan operates at the (user selected) default low airflow rates during the first three minutes from system start-up. These Figures also show the condenser liquid temperature takes about two minutes to reach the steady-state condenser liquid temperature. This built-in period of three minutes assures the condenser liquid temperature has reached its steady-state value thus preventing nuisance fan speed switch-overs caused by any transient conditions. An additional benefit for the low-airflow during heating cycle is: it reduces the cold draft on system startup. After the elapse of this initial period the indoor air-flow is based on condenser liquid line temperature relationship shown in FIGS. 8A and 8B.

Figure 10A:
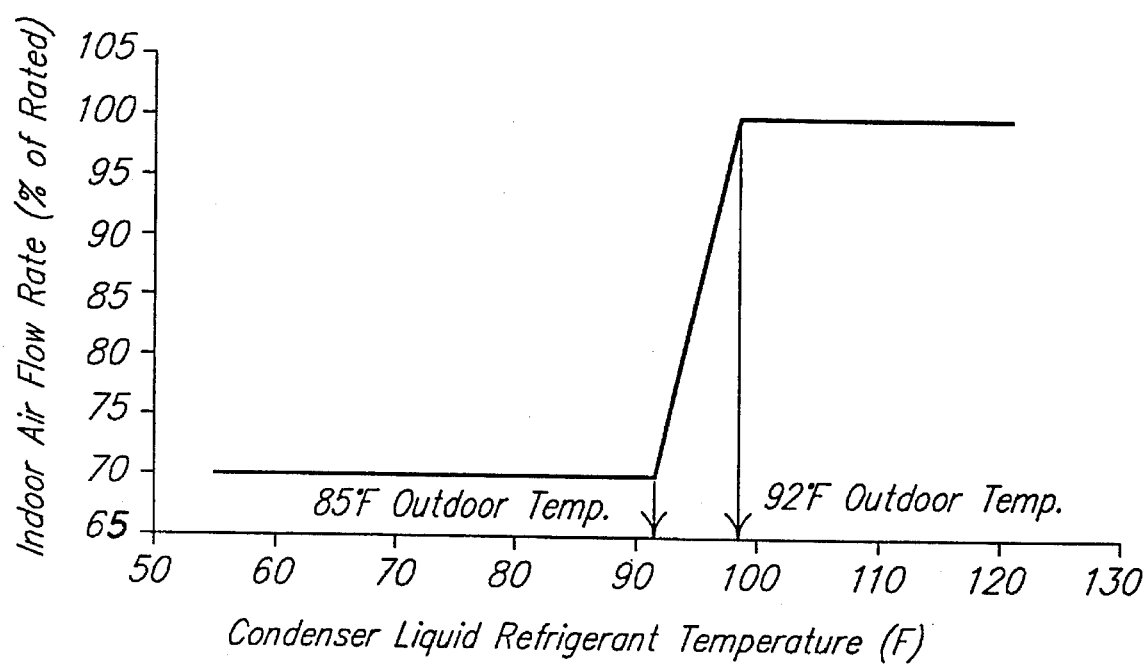
FIGS. 10A and 10B are graphs depicting the indoor airflow rate as a function of condenser liquid refrigerant temperature, FIG. 10A corresponding to a heat pump in Cooling mode and FIG. 10B corresponding to a heat pump in Heating mode.
Figure 10B:
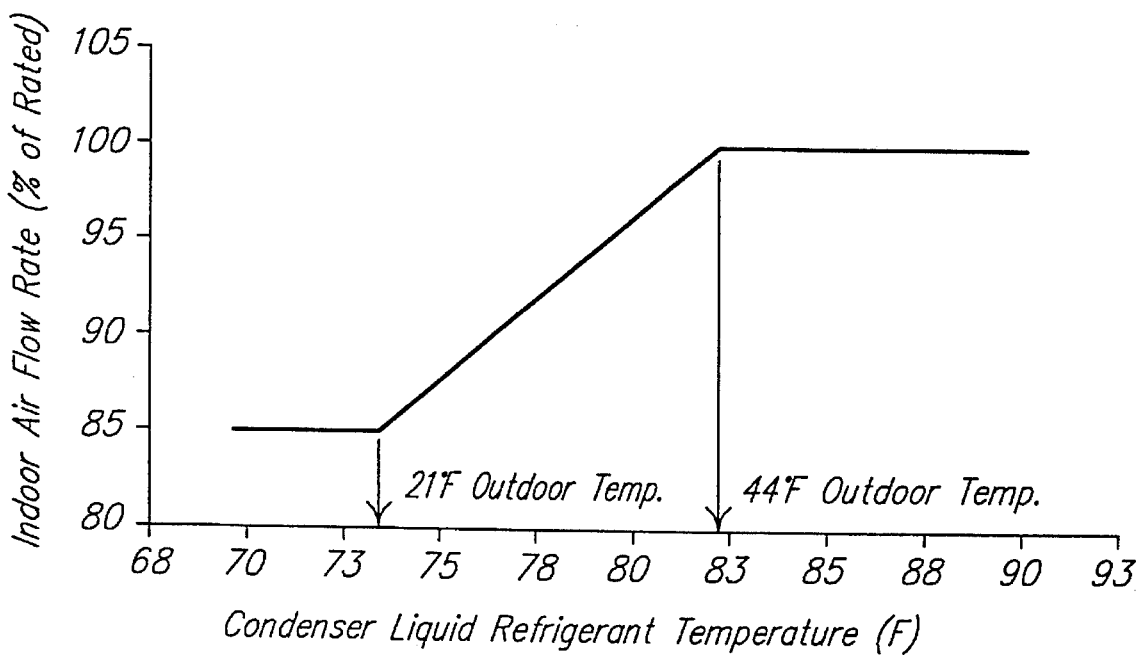
Figure 11A:
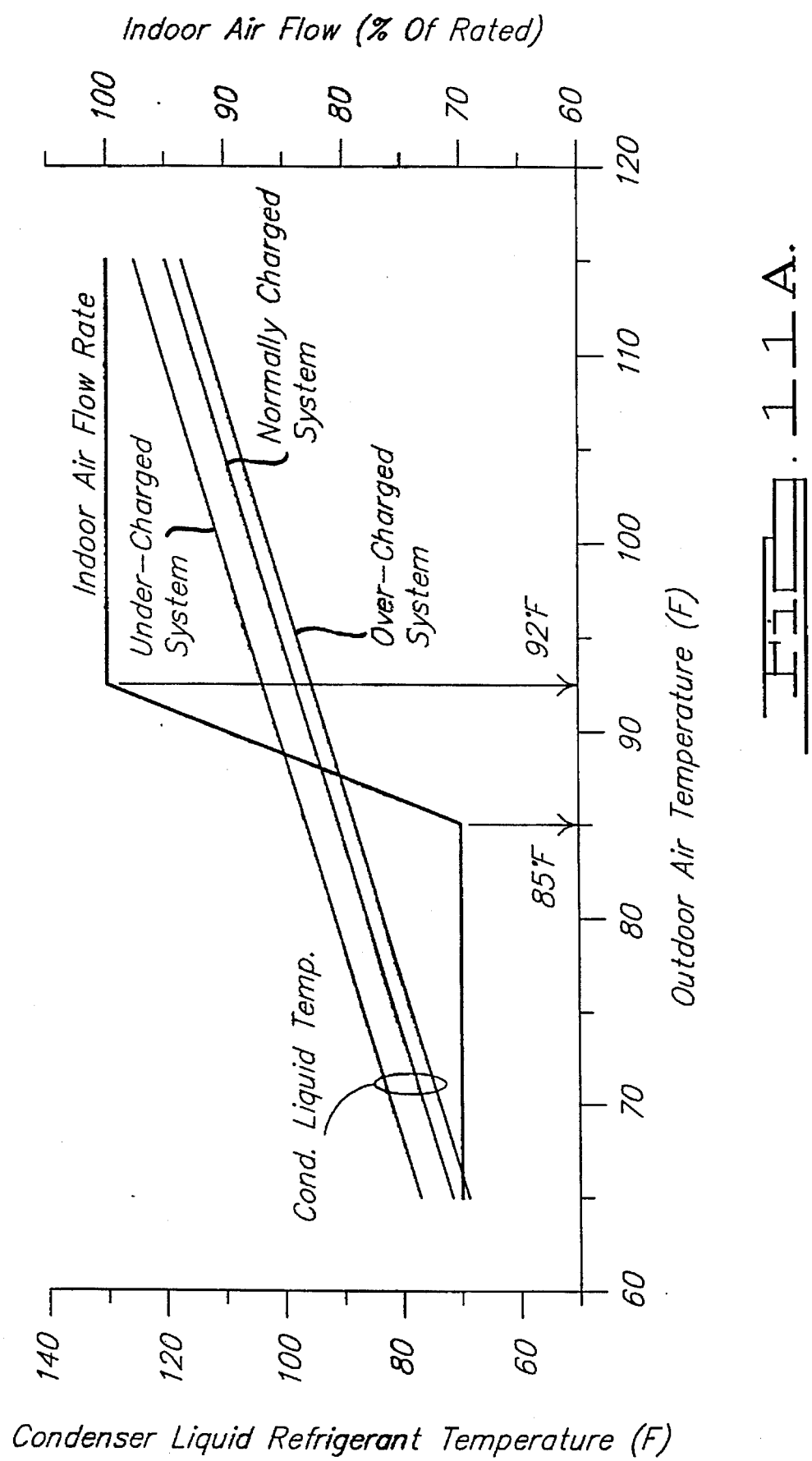
FIGS. 11A and 11B are each a family of graphs depicting indoor airflow and condenser liquid refrigerant temperature as a function of outdoor air temperature, FIG. 11A corresponding to a heat pump in Cooling mode and FIG. 11B corresponding to a heat pump in Heating mode.
Figure 11B:
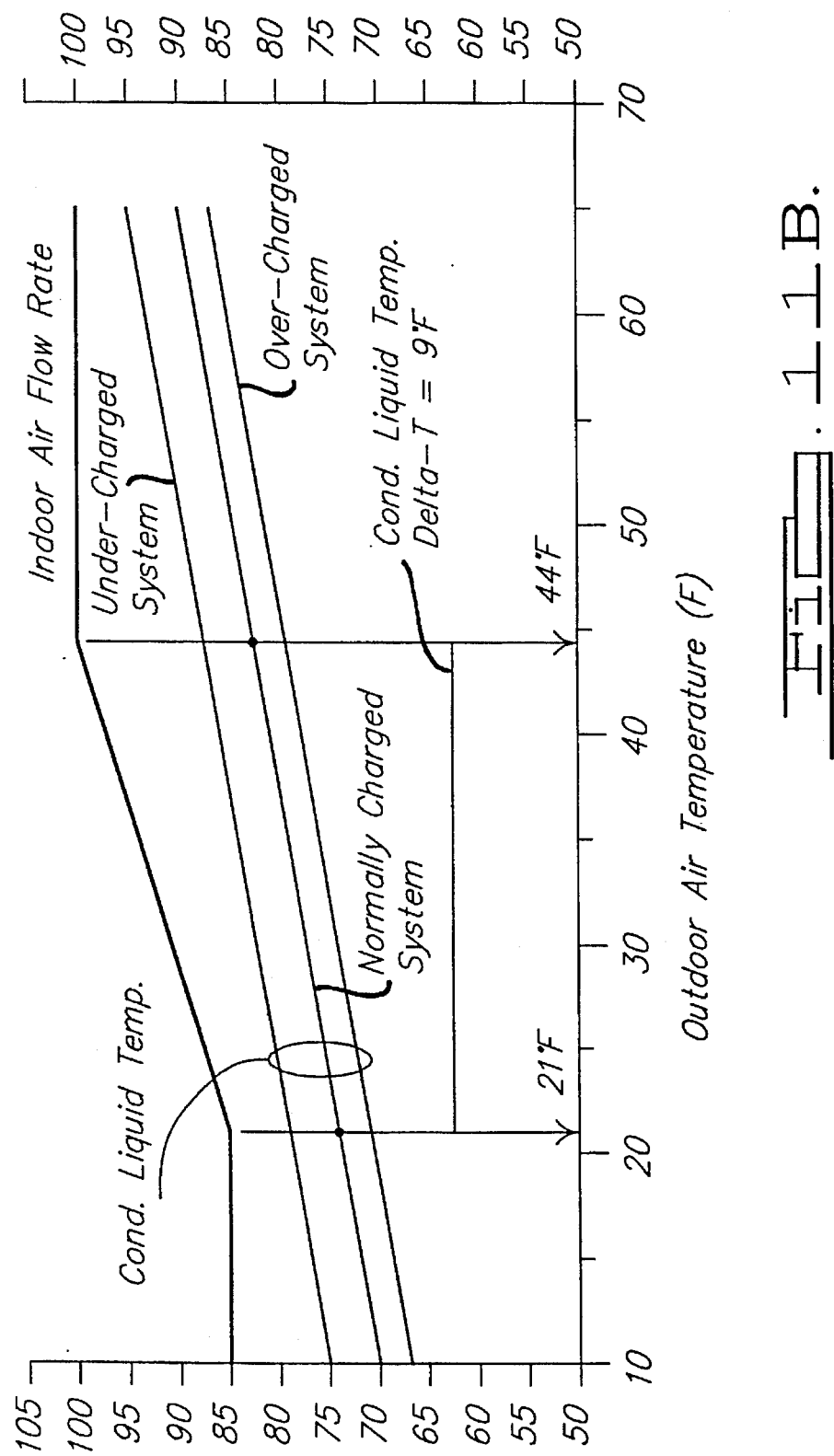

By way of further illustrating the principles of the invention, FIGS. 10A–10B and FIGS. 11A–11B show another presently preferred look-up table may be arrived at. As illustrated in these Figures, the indoor airflow rate can have a portion that is continuously variable, in this case linearly variable, over a predetermined range of condenser liquid refrigerant temperature (FIGS. 10A–10B) and outdoor air temperature (FIGS. 11A–11B). Thus, referring to FIG. 10A, the indoor airflow rate holds steady at a 70% of rated capacity for temperatures below about 92°. The indoor airflow rate then ramps up linearly until the condenser liquid refrigerant temperature reaches about 98°. For condenser liquid refrigerant temperatures above 98°, the indoor airflow rate is set at 100% of its rated speed. A similar airflow rate curve may be implemented for Heating mode. This is shown in Figure 10B. The indoor airflow rate is set at 85% of rated capacity for condenser liquid refrigerant temperatures below about 74°. The indoor airflow rate then ramps up, in this case linearly, until the condenser liquid refrigerant temperature reaches about 83°. Above 83° the indoor airflow rate is set is at 100% of rated speed.

FIGS. 11A and 11B illustrate further the embodiment shown in FIGS. 10A and 10B. These Figures illustrate the outdoor air temperature at which the indoor airflow speed is switched from constant speed to variable speed. Specifically, in the Cooling mode (FIG. 11A) the indoor airflow is operated in variable speed mode in the range between about 85° to 92°. In the Heating mode (FIG. 11B) the indoor airflow is operated in a variable speed mode between the outdoor air temperatures of 21° to 44°. Also superimposed on FIGS. 11A and 11B are a family of straight line graphs depicting the condenser liquid temperature as a function of outdoor air temperature, for the normally charged system, for the overcharged system and for the undercharged system.

In the embodiment illustrated in FIGS. 10A–10B and FIGS. 11A–11B the inflection points at which indoor airflow speed is switched from constant mode to variable mode are determined in relation to the system rating points. For example, the inflection point in FIG. 10A is set at a predetermined 98° F. condenser liquid temperature corresponding to 92° F. outdoor temperature. This inflection point is selected because of the 3° F. temperature measurement tolerance to account for errors arising from: sensor accuracy, analog-to-digital conversion location and method of sensor mounting on system tubing. The built-in measurement tolerance ensures the indoor fan operates at the rated airflow (100%) at the system capacity rating point of 95° F. outdoor temperature. Similarly, the predetermined inflection point of 91° F. condenser liquid temperature (corresponding to 85° F. outdoor temperature) ensures that the indoor fan speed change occurs ahead of the 82° F. system efficiency rating point.

In the embodiment illustrated in FIGS. 10A–10B and FIGS. 11A–11B the variable speed range is a proportional range, in this case a linear function (straight line). If desired, other variable speed relationships can be implemented, including nonlinear relationships. Also, while the illustrated embodiment breaks the indoor airflow rate control into two fixed speed ranges and a variable speed range, other combinations are also possible. Thus the look-up table may be alternatively programmed to achieve a fully variable range (no fixed speed portions). Alternatively, other combinations, such as multiple variable speed ranges of different slope, or multiple discrete steps may be used. In this regard, a multiple discrete step "stairstep" function can be used to approximate the proportional variable speed range.

From the foregoing, it will be seen that the present invention provides an indoor fan speed control means which is capable of optimally setting the forced airflow based on a single temperature sensor measurement. The sensor measurement provides an indication of diverse system conditions (outdoor air temperature and compressor operation) which are then used to optimally control the indoor fan speed. While the invention has been described in its presently preferred embodiment, it will be understood that the invention is capable of certain modification without departing from the spirit of the invention as set forth in the appended claims.

What is claimed is:

1. In a heat pump/air-conditioner system of the type having a compressor for delivering liquid refrigerant through an expansion orifice into an indoor heat exchanger, an optimized forced air heat exchanging system comprising:

a fan positioned in said heat pump/air-conditioner system to direct indoor airflow into heat exchange contact with said indoor heat exchanger, said fan having at least two speeds of operation;

a temperature sensor coupled to said heat pump system for sensing the temperature of the liquid refrigerant;

a control circuit coupled to said fan and to said temperature sensor for controlling the speed of the fan based on the temperature of the liquid refrigerant.

2. The system of claim 1 wherein said fan is a variable speed fan having separately selectable discrete speeds of operation.

3. The system of claim 1 wherein said fan is a variable speed fan having continuously variable speeds of operation.

4. The system of claim 1 wherein said fan includes an electronically commutated variable-speed motor.

5. The system of claim 1 wherein said compressor is coupled to said expansion orifice by a fluid conduit and wherein said temperature sensor is in thermal contact with said fluid conduit or in a direct contact with the fluid.

6. The system of claim 5 wherein said temperature sensor is disposed adjacent said expansion orifice.

7. The system of claim 1 further comprising a refrigerant flow control device which defines said expansion orifice and which has a condenser side and an evaporator side; and wherein said temperature sensor is coupled to said heat pump system on the condenser side of said flow control device.

8. The system of claim 1 wherein said control circuit compares the sensed temperature of the liquid refrigerant with a predetermined temperature and controls the speed of the fan based on said comparison.

9. The system of claim 1 wherein said control circuit compares the sensed temperature of the liquid refrigerant with a predetermined temperature and causes the fan to operate in the cooling mode:

(a) at a first speed if the sensed temperature is above said predetermined temperature and (b) at a second speed if the sensed temperature is equal to or below said predetermined temperature.

10. The system of claim 1 wherein said control circuit compares the sensed temperature of the liquid refrigerant with a predetermined temperature and causes the fan to operate in the heating mode:

(a) at a first speed if the sensed temperature is below said predetermined temperature and (b) at a second speed if the sensed temperature is equal to or above said predetermined temperature.

11. The system of claim 1 wherein said control circuit includes processor means for periodically comparing the sensed temperature with a predetermined temperature and for selectively altering the fan speed based on said periodic comparison.

12. The system of claim 1 wherein said control circuit compares the sensed temperature of the liquid refrigerant with first and second predetermined temperatures and causes the fan to operate in the cooling mode:

(a) at a first speed if the sensed temperature is below said first predetermined temperature;

(b) at a proportionally variable speed if the sensed temperature is above said first predetermined temperature and below said second predetermined temparature; and (c) at a second speed if the sensed temperature is above said second predetermined temperature.

13. The system of claim 1 wherein said control circuit compares the sensed temperature of the liquid refrigerant with first and second predetermined temperatures and causes the fan to operate in the heating mode:

(a) at a first speed if the sensed temperature is below said first predetermined temperature;

(b) at a proportionally variable speed if the sensed temperature is above said first predetermined temperature and below said second predetermined temparature; and (c) at a second speed if the sensed temperature is above said second predetermined temperature.

14. The system of claim 1 wherein said control circuit reads the sensed temperature of the liquid refrigerant and causes the fan to operate at a speed that is proportionally variable in response to said sensed temperature.

15. The system of claim 1 wherein said control circuit reads the sensed temperature of the liquid refrigerant and causes the fan to operate at a speed that is a substatnially linear function of a parameter indicative of said sensed temperature.

16. The system of claim 1 wherein said control circuit reads the sensed temperature of the liquid refrigerant and causes the fan to operate selectively according to one of the following:

(a) at a speed that is a substantially linear function of a parameter indicative of said sensed temperature; and (b) at a fixed speed.

17. A method for optimizing forced air heat exchange in a heat pump/air-conditioner system of the type having a compressor for delivering liquid refrigerant through an expansion orifice into an indoor heat exchanger, comprising:

directing an optimized forced indoor airflow onto said heat exchanger;

sensing the temperature of the liquid refrigerant; and controlling the speed of the airflow based on the temperature of the liquid refrigerant.

18. The method of claim 17 wherein said controlling step is performed by controlling the speed of a fan in discrete steps.

19. The method of claim 17 wherein said controlling step is performed by controlling the speed of a fan over a continuously variable range.

20. The method of claim 17 wherein said sensing step is performed using a temperature sensor in thermal contact with a fluid conduit containing said liquid refrigerant.

21. The method of claim 17 wherein said sensing step is performed using a temperature sensor in thermal contact with said liquid refrigerant.

22. The method of claim 17 wherein said sensing step is performed by sensing temperature of the liquid refrigerant at a point adjacent said expansion orifice.

23. The method of claim 17 wherein said controlling step is performed by sensing the temperature of the liquid refrigerant, comparing the sensed temperature with a predetermined temperature and controlling the speed of the airflow based on said comparison.

24. The method of claim 17 wherein said controlling step is performed by sensing the temperature of the liquid refrigerant, comparing the sensed temperature with a predetermined temperature and controlling the speed of the airflow based on said comparison, as follows:

(a) causing the airflow speed to be a first predetermined speed if the sensed temperature is above said predetermined temperature; and (b) causing the airflow speed to be a second predetermined speed if the sensed temperature is not above said predetermined temperature.

25. The method of claim 17 wherein said controlling step is performed by sensing the temperature of the liquid refrigerant, comparing the sensed temperature with a predetermined temperature and controlling the speed of the airflow based on said comparison, as follows:

(a) causing the airflow speed to be a first predetermined speed if the sensed temperature is below said predetermined temperature; and (b) causing the airflow speed to be a second predetermined speed if the sensed temperature is not below said predetermined temperature.

26. The method of claim 17 wherein said controlling step is performed by periodically comparing the sensed temperature with a predetermined temperature and selectively altering the airflow speed based on said periodic comparisons.

27. In a heat pump system of the type having a compressor for delivering liquid refrigerant through an expansion orifice into a heat exchanger, an improved forced air heat exchanging system comprising:

a fan positioned in said heat pump system to direct an airflow into heat exchange contact with said heat exchanger, said fan having at least two speeds of operation;

a temperature sensor coupled to said heat pump system for sensing the temperature of the liquid refrigerant;

a compressor diagnostic system coupled to said temperature sensor for providing an indication of whether the compressor is operational based on temperature of the liquid refrigerant;

a control circuit coupled to said fan and to said compressor diagnostic system and to said temperature sensor for controlling the speed of the fan based on the temperature of the liquid refrigerant and based on said indication of whether the compressor is operational.

28. The system of claim 27 wherein said control circuit causes said fan to operate continuously when said compressor diagnostic system determines the compressor is not operational.

29. The system of claim 27 wherein said compressor diagnostic system determines whether the compressor is operational by comparing the liquid refrigerant temperature determined at a first time upon compressor start up with the liquid refrigerant temperature determined at a second time after said first time.

30. The system of claim 29 wherein said diagnostic system determines the compressor is not operational if the liquid refrigerant temperatures determined at said first and second times are not greater than about 5° F.

* * * * *

UNITED STATES PATENT AND TRADEMARK OFFICE
CERTIFICATE OF CORRECTION

PATENT NO. : 5,533,352  Page 1 of 2
DATED : July 9, 1996
INVENTOR(S) : Vijay O. Bahel et al It is certified that error appears in the above-indentified patent and that said Letters Patent is hereby corrected as shown below:

Abstract, line 4, "liquid" should be -- Liquid --.

Column 2, line 12, "to-the" should be -- to the --.

Column 2, line 12, "controller" should be -- controlling --.

Column 2, line 44, "C" should be -- 4C --.

Column 2, line 59, "doffed" should be -- dotted --.

Column 3, line 24, delete ",".

Column 6, line 2, "FIG." should be -- FIGS. --.

Column 6, lines 5, 6 delete "A with the reference numerals being primed.".

Column 7, line 45, delete "is".

UNITED STATES PATENT AND TRADEMARK OFFICE
CERTIFICATE OF CORRECTION

PATENT NO. : 5,533,352
DATED : July 9, 1996
INVENTOR(S) : Vijay O. Bahel et al

It is certified that error appears in the above-indentified patent and that said Letters Patent is hereby corrected as shown below:

Column 9, line 46, "temparature" should be -- temperature --.

Column 9, line 55, "substatnially" should be -- substantially --.

Signed and Sealed this

Seventeenth Day of December, 1996

*Attest:*

BRUCE LEHMAN

*Attesting Officer*     *Commissioner of Patents and Trademarks*